United States Patent [19]

Sheynblat

[11] Patent Number: 5,587,716
[45] Date of Patent: Dec. 24, 1996

[54] GAP COVERAGE FOR GPS SIGNALS

[75] Inventor: Len Sheynblat, Belmont, Calif.

[73] Assignee: Trimble Navigation, Ltd., Sunnyvale, Calif.

[21] Appl. No.: 537,110

[22] Filed: Sep. 29, 1995

[51] Int. Cl.⁶ .............................. H04B 7/185; G01S 5/02
[52] U.S. Cl. ............................................................ 342/357
[58] Field of Search ........................... 342/357; 455/12.1

[56] References Cited

U.S. PATENT DOCUMENTS

5,398,034  3/1995  Spilker, Jr. .............................. 342/357

Primary Examiner—Theodore M. Blum
Attorney, Agent, or Firm—John Schipper

[57] ABSTRACT

A method for compensating for temporary loss of differential GPS correction signals for a satellite, numbered j, during an IODE changeover interval. Differences $\Delta e_i(t;j;n+1,n) = e_i(t;j;n+1) - e_i(t;j;n)$ ($i=1, \ldots, I$) are formed for I ephemeris parameters used to describe the ephemeris for the satellite (j) during IODE intervals number n+1 and n. These differences are approximated for a DGPS blank-out time interval, given by $t(j;n+1)_{IODE} \Delta t_{rev,mob} \leq t < t(j;n+1)_{IODE} + \Delta t_{ch} + \Delta t_{rev,ref}$, during which a GPS reference station continues to broadcast DGPS correction information based on the old ephemeris data that was valid during the preceding IODE time interval, given by $t(j;n)_{IODE} \leq t < t(j;n+1)_{IODE}$. These ephemeris differences are used by a mobile station that receives DGPS correction information from the GPS reference station to produce corrected GPS information for a blank-out time interval. Ephemeris parameter differences can be replaced by differences of satellite-station ranges $\Delta R(t;j;n+1,n) = R(t;j;n+1) - R(t;j;n)$ in an alternative approach.

13 Claims, 4 Drawing Sheets

GAP COVERAGE FOR GPS SIGNALS

FIELD OF THE INVENTION

This invention relates to provision of needed GPS signal information when such information is not available from GPS satellites due to satellite parameter changeover.

BACKGROUND OF THE INVENTION

Each Global Positioning System (GPS) satellite in a constellation broadcasts satellite clock parameters and ephemerides and almanac information, for that satellite and for all constellation satellites, respectively, in a 50 bit-per-second stream that is received and used by a GPS signal antenna and receiver/processor, for use in determination of the time of signal receipt by, and location and velocity of, that antenna. At certain times, usually at two-hour and four-hour intervals, a GPS satellite will change its ephemeris and/or almanac parameters, its clock correction parameters and other related parameters that are included in the broadcast bit stream, in order to provide more accurate satellite information for a present time interval. During this IODE changeover transition period, which may continue for up to 90 seconds, the differential GPS (DGPS) correction information normally broadcast by a GPS reference station becomes formally unavailable, and DGPS signals from that reference station cannot be used directly for purposes of correction of the GPS signals received by a mobile GPS station from that satellite. The information content of the GPS signals and the signal changeover formalities are discussed in the ICD-GPS-200 Interface Document, published for the U.S. Government by Rockwell International Corporation, Satellite Systems Division, Revision B, 3 Jul. 1991, incorporated by reference herein.

Under the protocol adopted for Type 9 messages for the U.S. Coast Guard's Radio Technical Communication Marine (RTCM) communications of GPS information, a GPS reference station must delay transmitting information in a Type 9 message for a particular GPS satellite for a time interval of 90 seconds whenever a new Issue Of Data Ephemeris (IODE) is received by that reference station for that satellite. This time delay (90–120 seconds) is imposed to allow a target mobile GPS station, which is receiving GPS signals from that satellite and is receiving DGPS signals from that reference station, time to receive and decode the new ephemeris parameters for that satellite.

Under two early versions of the RTCM protocol, a Type 2 message was transmitted containing a range difference, computed around the time of transmission, between the ephemeris data for the new IODE regime (referred to as regime "n+1" herein) and the ephemeris data for the preceding IODE regime (referred to as regime "n" herein). Under a superseding version of the RTCM protocol, this Type 2 message is no longer transmitted. One result of this change is that a mobile station receiving RTCM messages cannot compensate for differences between the ephemeris information available and the ephemeris information needed during the changeover transition interval.

If this target mobile GPS station is using GPS and DGPS signals for that satellite (j), the DGPS information provided by the reference station during the IODE changeover transition interval is referenced to the older ephemeris data in IODE(j;n). However, the only ephemeris data available to the mobile station during the IODE changeover transition interval are the new ephemeris data in IODE(j;n+1). The target mobile GPS station can employ additional memory and double buffering, whereby ephemeride information (1) before IODE changeover and (2) after IODE changeover for that GPS satellite (j) are both stored for use during this IODE changeover transition interval. However, this requires provision of substantial extra memory within the target mobile GPS station, and this extra memory is used only during a 90-second changeover period, at most once every two hours. Space for this extra memory (a minimum of 900 bits per satellite for ephemeris and 300 bits per satellite for Universal Coordinated Time (UTC) parameters) may be unavailable in some GPS receiver/processors. Further, the associated efficiency of use of the information stored in this extra memory, a maximum of 1.25 percent, is not inspiring.

Barnard, In U.S. Pat. No. 5,119,102, discloses a vehicle location system, using GPS location determination signals and GPS satellite orbit information computed from downloaded ephemeris parameters for the satellites.

In U.S. Pat. No. 5,204,818, Landecker et al disclose survey satellite apparatus with an on-board computer that processes and compares planetary and celestial sensor data with sensor data in an on-board database, to identify any satellite misorientation or translation errors present. Satellite attitude and ephemeris are autonomously updated to reflect the present orientation and location of the satellite.

A GPS station that remembers the last-observed ephemeris data and the corresponding time of observation, when power is turned off, is disclosed by Ando et al in U.S. Pat. No. 5,222,245. If power is turned on again within a short time, the station uses the last-observed ephemeris data (before power turn-off) to estimate the present ephemeris data to process and initially estimate the present location of the station.

Mueller et al disclose a network of reference stations that track a plurality of GPS satellites and provide differential GPS corrections in U.S. Pat. No. 5,323,322. Each reference station receives GPS satellite signals, independently determines ephemeris data for each visible satellite and uses these data to provide differential GPS corrections for that satellite at that reference station.

U.S. Pat. No. 5,375,059, issued to Kyrtsos et al, discloses a GPS-assisted vehicle location determination system. Previously observed and presently observed ephemeris data for a satellite are processed to estimate the present pseudorange from that satellite to a GPS station carried on the vehicle.

A method for predicting the location of a satellite in a satellite-based navigation system is disclosed by Kyrtsos in U.S. Pat. No. 5,430,657. Orbital parameters, computed for a satellite, are used to predict a satellite location at a future time. Observed and predicted location are compared for that future time to determine whether the ephemeris data for that satellite are corrupted.

None of these approaches provides acceptable ephemeris data during an IODE changeover transition to use of new ephemeris parameters for one or more satellites. What is needed is an approach that provides RTCM Type 9 message information of acceptable accuracy during this IODE changeover transition interval, or at any other time such information may be needed. Preferably, this approach should allow use of additional computations of at most modest complexity that can be performed in parallel with the normal computations made by the target mobile GPS station to determine the station's present location, velocity and/or time of observation values ("position values"). Preferably, the amount of additional memory, if any, required for storing the additional information used in this approach should be small compared to the additional memory required for the straightforward compensation approach discussed earlier.

SUMMARY OF THE INVENTION

These needs are met by the invention, which uses polynomial approximations in the time variable t for the satellite location computations, based on parameters that become unavailable during an IODE changeover interval, to extend the use of the parameter approximations over the IODE changeover interval. The polynomial used here may be as low as second or third degree (i.e., a quadratic or cubic polynomial), with associated inaccuracy in ephemeris-determined satellite location as low as a few meters. If a third degree or higher degree polynomial is used here, the associated inaccuracy in ephemeris-determined satellite location can be reduced to a few centimeters or less, where the time interval for approximation has a length of 300 seconds or less.

During the IODE changeover transition interval, the mobile station computes and stores coefficients for an Mth degree polynomial ($M \geq 2$) for the difference $\Delta e_i(t;j;n+1,n) = e_i(t;j;n+1) - e_i(t;j;n)$ between each ephemeris parameter for the new regime IODE(j;n+1) and the corresponding ephemeris parameter for the old regime IODE(j;n). Alternatively, the mobile station computes and stores coefficients for an Nth degree polynomial ($N \geq 2$) for the difference in range $\Delta R(t;j) = R'(t;j) - R'(t;j)$ from the satellite (j) to the reference station (referred to as "orbital data"), between the new regime IODE(j;n+1) and for the old regime IODE(j;n). The old ephemeris data and orbital data are available for a time interval that extends beyond the IODE changeover from IODE(j;n) to IODE(j;n+1), and even beyond the end of the IODE changeover transition interval; and the new ephemeris data and orbital data become available from the satellite (j) shortly after the new regime IODE(j;n+1) begins. Thus, all required ephemeris data or orbital data are available for computation of the ephemeris parameter differences $\Delta e_i(t;j;n+1,n)$ or the range differences $\Delta R(t;j)$ within a single GPS receiver computational cycle after the new regime IODE(j;n+1) begins; that is, during the IODE changeover transition interval. The polynomial approximations for the ephemeris parameter differences $\Delta e_i(t;j;n+1,n)$ or range differences $\Delta R(t;j)$ are computed and used to convert the new ephemeris data $e_i(t;j;n+1)$ or range data $R''(t;j)$ to an approximation of the old ephemeris data $e_i(t;j;n)$ or old range data $R'(t;j)$, for use by the mobile station during the IODE changeover transition interval. The mobile station then uses these (approximations to) old ephemeris data or old range data for the visible satellites (j), the GPS signals received from the satellites, and the DGPS corrections (referenced to the old ephemeris data) received from the reference station to compute corrected GPS signals and present location and velocity coordinates with improved accuracy.

DESCRIPTION OF BEST MODES OF THE INVENTION

Figure 1:
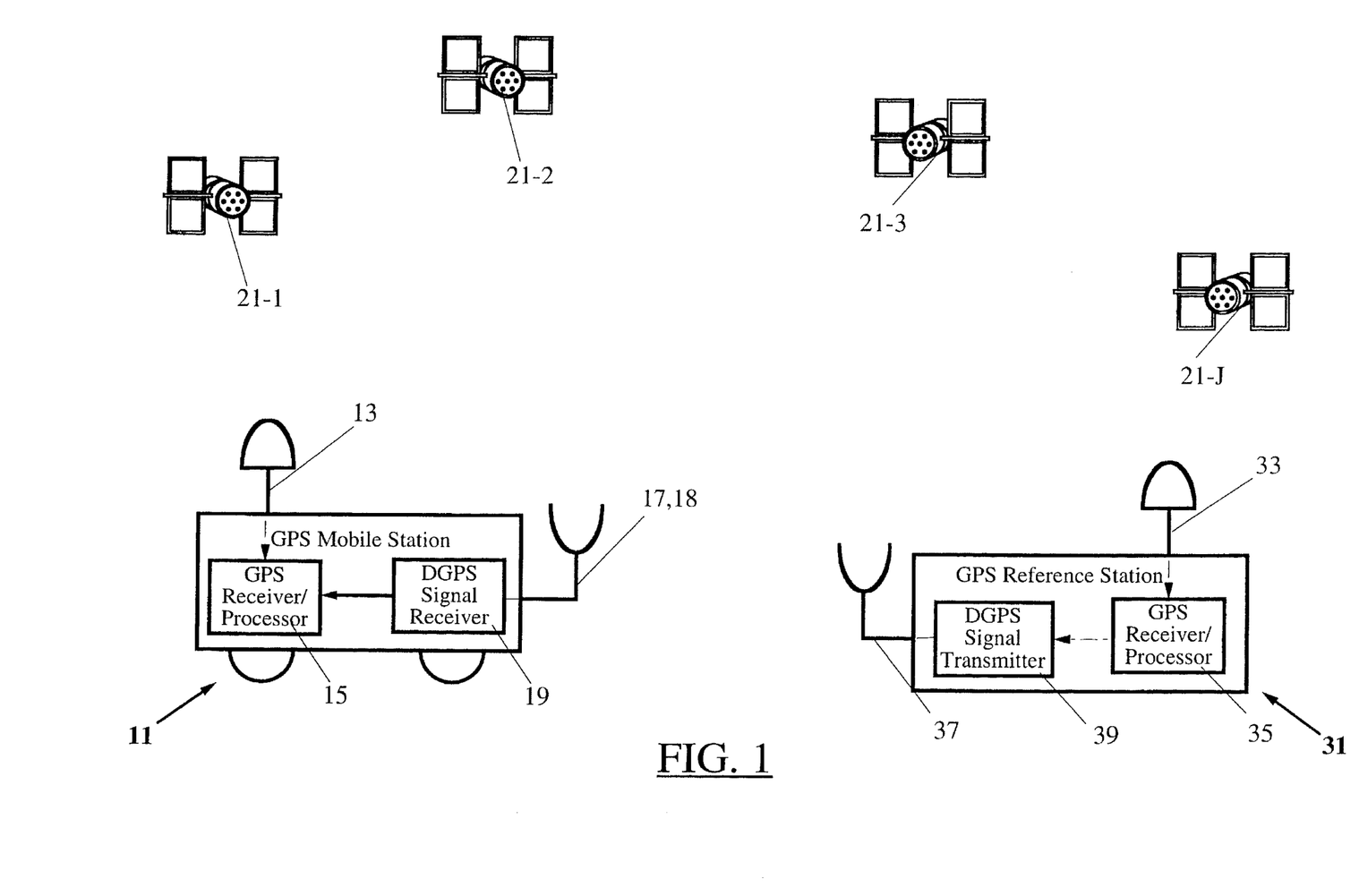
FIG. 1 illustrates an environment in which the invention is useful.

FIG. 1 schematically illustrates an environment in which the invention can be used. A GPS mobile station 11, including a GPS signal antenna 13 and a GPS signal receiver/processor 15, receives GPS signals from a plurality of GPS satellites 21–j (j=1, 2, . . . , J; $J \geq 4$) and determines the uncorrected present location, velocity and/or time of observation for the mobile station from measurements of these GPS signals. The GPS mobile station 11 includes a DGPS signal antenna 17 and associated DGPS signal receiver 19, connected to the GPS receiver/processor 15, that receive differential GPS correction (DGPS) signals from one or more GPS reference stations 31 spaced apart from the GPS mobile station.

The location of the GPS reference station 31 is known with high accuracy, and this station also receives GPS signals from the plurality of GPS satellites 21–j, at a GPS signal antenna 33 and GPS signal receiver/processor 35. The GPS reference station 31 knows the range R(t;j) from its own location to satellite 21–j as a function of time, for IODE interval number n' (n'=n, n+1). The GPS reference station 31 compares the uncorrected time-varying GPS signals $GPS(t;j;ref)_{unc}$ it receives from each GPS satellite 21–j with the nominal time-varying signals $GPS(t;j;ref)_{nom}$ it should receive from that satellite at the known location of the reference station and determines DGPS signals that correct the GPS signals actually received, using the relations $$DGPS(\tau';j;ref) = GPS(\tau';j;ref)_{nom} - GPS(\tau';j;ref)_{unc}, \quad (1)$$

at a time $t=\tau'$ for which the DGPS computations are made. The GPS reference station 31 then broadcasts these DGPS signals and the associated correction time $t=\tau'$, for use by nearby mobile GPS stations such as 11, using a DGPS signal antenna 37 and associated DGPS signal transmitter 39. If the U.S. Coast Guard RTCM protocol is used, the DGPS signals are broadcast as part of a Type 9 RTCM message, at time intervals as short as 0.5 sec. The broadcast DGPS signals are received and used by the GPS mobile station 11 to approximately correct the uncorrected GPS signals $GPS(t;j;mob)_{unc}$ received at the mobile station, using the relations $$GPS(\tau';j;mob)_{nom} = GPS(\tau';j;mob)_{unc} + DGPS(\tau';j;ref), \quad (2)$$

where the time $\tau'$ refers to the time for which the mobile station GPS signals were measured. This requires that the mobile GPS station 11 compute its corrected GPS signals $GPS(\tau';j;mob)_{nom}$ at some time $t=\tau''(>\tau')$, with an associated time delay $\Delta t_{delay} \approx \tau'' - \tau'$, after the time $t=\tau'$ the DGPS signal computations are made at the GPS reference station. In practice, the time delay $\Delta t_{delay}$ is usually quite small, at most a few seconds, because the DGPS signals are computed and broadcast quickly and because the GPS mobile station 11 is usually no more than 50–300 km from the GPS reference station 31.

In an alternative approach, the GPS mobile station 11 contains a GPS signal retransmitter 18, and the mobile station transmits its unprocessed (or partly processed) and uncorrected GPS signals $GPS(\tau'';j;mob)_{unc}$ and times of observation $\tau''$ to the GPS reference station 31. The GPS reference station 31 then computes the corrected GPS signals $GPS(\tau'';j;mob)_{cor}$ for the GPS mobile station 11, using Eq. (2), and (i) stores these corrected signals for subsequent use, and/or (ii) processes these corrected signals to determine corrected locations, velocities and/or times of observation for the mobile station and/or (iii) transmits these corrected signals to the mobile station for subsequent GPS signal processing at the mobile station.

These procedures can be used as long as presently-applicable DGPS signals are received from the GPS reference station 31. A GPS satellite 21–j will experience an IODE changeover at specified times $t=t(j;n)_{IODE}$ (j=1, 2, . . . , J; n=1, 2, . . . ), where $t(j;n+1)_{IODE}-t(j;n)_{IODE}$ is usually 2 hours, 4 hours, etc. For a time interval defined by $t(j;n)_{IODE} \leq t < t(j;n+1)_{IODE}$, the ephemeris parameters $e_i(t;j;n)$ corresponding to IODE(j;n) apply for GPS satellite number j. For a time interval defined by $t>t(j;n+1)_{IODE}+\Delta t_{ch}$ ($\Delta t_{ch}>0$), the ephemeris parameters $e_i(t;j;n+1)$ corresponding to IODE(j;n+1) apply for GPS satellite number j. During a time interval of selected length $\Delta t_{ch}$ (now≈90 sec) beginning at an IODE changeover time $t=t(j;n+1)_{IODE}$, U.S. Coast Guard and Canadian Coast Guard protocol for RTCM requires that a GPS reference station refrain from broadcasting a DGPS correction for the satellite 21–j in a Type 9 RTCM message, or that the GPS reference station broadcast a DGPS correction computed with reference to the ephemeris parameters $e_i(t;j;n)$ that apply during the old regime, IODE(j;n).

Figure 2:
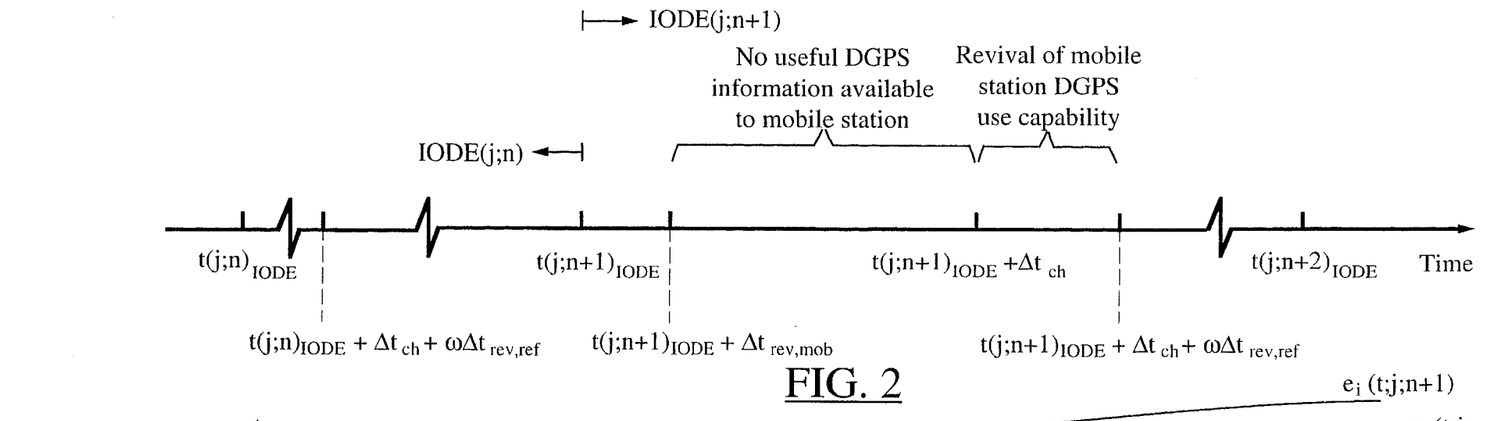
FIG. 2 is a timeline graph illustrating the relative times of occurrence of events related to IODE changeover for a particular GPS satellite.

This is illustrated schematically in a timeline graph in FIG. 2. During a changeover time interval, defined by $t(j;n+1)_{IODE} \leq t \leq t(j;n+1)_{IODE}+\Delta t_{ch}$, presently-applicable DGPS information, corresponding to IODE(j;n+1), is not available from any GPS reference station for the satellite 21–j. However, the mobile station 11 and the reference station 31 receive GPS signals and ephemeris data from satellite 21–j, applicable to the new regime IODE(j;n+1), for all times during this new IODE time interval.

Under a conventional approach, when a GPS mobile station 11 detects a changeover in ephemeris data from a satellite 21–j, confirmed by a change from IODE(j;n) to IODE(j;n+1), the mobile station must wait for a corresponding change in the RTCM Type 9 message transmitted by the reference station 31 and cannot use any DGPS information during the IODE changeover transition time interval, which has temporal length at least $\Delta t_{ch}$. The reference station 31 will continue to transmit DGPS correction signals, computed with reference to the old regime ephemeris parameters $e_i(t;j;n)$ (i=1, . . . , I; I≧1) for satellite j, during an extended time interval given by $t(j;n+1)_{IODE} \leq t < t(j;n+1)_{IODE}+\Delta t_{ch}+\Delta t_{rev,ref}$ that includes the IODE changeover transition time interval and that extends beyond this transition interval by an additional time interval of length $\Delta t_{rev,ref}$. The reference station requires a time interval of temporal length $\Delta t_{rev,ref}$ (≈18–30 seconds) to decode the new ephemeris data, corresponding to IODE(j;n+1), and to install the newly decoded ephemeris information. Only after this time interval of temporal length $\Delta t_{rev,ref}$ is completed can the reference station can begin to transmit DGPS corrections based on the new ephemeris data. In a similar manner, the mobile station requires a time interval of length $\Delta t_{rev,mob}$ (≈18–30 seconds) to decode the new ephemeris data, corresponding to IODE(j;n+1), and to install the newly decoded ephemeris information. The mobile station (or the reference station) may decode and install the new ephemeris data as soon as the mobile station begins to receive these data, that is, during a decoding time interval given by $t(j;n+1)_{IODE} \leq t \leq t(j;n+1)_{IODE}+\Delta t_{rev,mob}$ ($t(j;n+1)_{IODE} \leq t \leq t(j;n+1)_{IODE}+\Delta t_{rev,ref}$.

The GPS mobile station 11 cannot determine whether the GPS reference station 31 is tracking the satellite 21–j, is decoding and installing the new ephemeris data $e_i(t;j;n+1)$ for satellite 21–j, or is performing some other, unrelated task during the extended time interval. During the IODE changeover transition time interval, the mobile station 11 cannot accept the DGPS correction signals in the Type 9 messages, because the reference station 31 still uses the old ephemeris parameters associated with IODE(j,n) to compute these DGPS correction signals and the mobile station 11 has already begun to receive the new ephemeris parameters associated with IODE(j,n+1). One or more of the ephemeris parameters $e_i(t;j;n)$ and/or $e_i(t;j;n+1)$ may be constant or vary linearly with time throughout an IODE time interval.

After the IODE changeover transition time interval has ended, in the conventional approach, the reference station 31 decodes and installs the new ephemeris data (in a decoding time interval of temporal length $\Delta t_{rev,ref}$) and then begins to transmit an RTCM Type 9 message with DGPS correction signals for the new regime IODE(j;n+1); and the mobile station 11 decodes and installs the new ephemeris data (in a decoding time interval of temporal length $\Delta t_{rev,mob}$) and then receives and begins to use these new regime DGPS correction signals and its already-received new ephemeris data for the satellite 21–j. Each of the decoding time intervals, of length $\Delta t_{rev,mob}$ or $\Delta t_{rev,ref}$, is usually between 18 sec and 30 sec, reflecting the fact that an additional time delay of three to five subframes (of temporal length about six seconds each) is imposed for decoding and revival of the DGPS use capability, before the mobile station or the reference station can begin to use or to transmit the RTCM Type 9 messages based on the new ephemeris data.

Under a conventional approach, the mobile station cannot use the ephemeris data and DGPS correction signals to correct the GPS signals the mobile station receives during a conventional blank-out time interval given by $t(j;n+1)_{IODE} \leq t \leq t(j;n+1)_{IODE}+\Delta t_{ch}+\max[\Delta t_{rev,mob}, \Delta t_{rev,ref}]$. During this conventional blank-out time interval, the mobile station cannot correct the GPS signals it receives from satellite j. This is inconvenient for a mobile station that must accurately and continuously determine its present location.

The invention avoids this period of suspended correction by providing the GPS mobile station 11 with ephemeris data for times t that span a modified blank-out time interval, which is given by $t(j;n+1)_{IODE}+\Delta t_{rev,mob} \leq t \leq t(j;n+1)_{IODE}+\Delta t_{ch}+\omega\Delta t_{rev,ref}$, where $\omega$ satisfies $0 \leq \omega \leq 1$ and $\omega$ depends upon when decoding and installation of the new ephemeris data is implemented at the reference station. If the new ephemeris data are decoded and installed at the reference station entirely during the changeover interval, $t(j;n+1)_{IODE} \leq t \leq t(j;n+1)_{IODE}+\Delta t_{ch}$, $\omega=0$. Otherwise, $0<\omega\leq 1$.

The mobile station 11 receives and stores ephemeris data for the satellite 21–j for the old IODE time interval, $t(j;n)_{IODE} \leq t < t(j;n+1)_{IODE}$ and for the new IODE time interval, $t(j;n+1)_{IODE} \leq t < t(j;n+2)_{IODE}$. The old regime ephemeris values $e_i(t;j;n)$ (i=1, . . . , I) are modeled for a first moving time interval, $t'_1 \leq t \leq t'_4$, and the new regime ephemeris values $e_i(t;j;n+1)$ are modeled for a second moving time interval, $t''_1 \leq t \leq t''_4$, with corresponding intermediate times $t'_2$ and $t'_3$ (old IODE regime), or $t''_2$ and $t''_3$ (new IODE regime), constrained by $$t'_1 < t'_2 \leq t(j;n+1)_{IODE} < t'_3 < t'_4, \qquad (3)$$

$$t''_1 < t''_2 \leq t(j;n+1)_{IODE}+\Delta t_{rev,mob} < t''_3 < t''_4. \qquad (4)$$

The values $t''_1$, $t''_2$, $t''_3$ and $t''_4$ are chosen independently of the values $t'_1$, $t'_2$, $t'_3$ and $t'_4$, subject to the constraints set forth in Eqs. (3) and (4).

Figure 3:
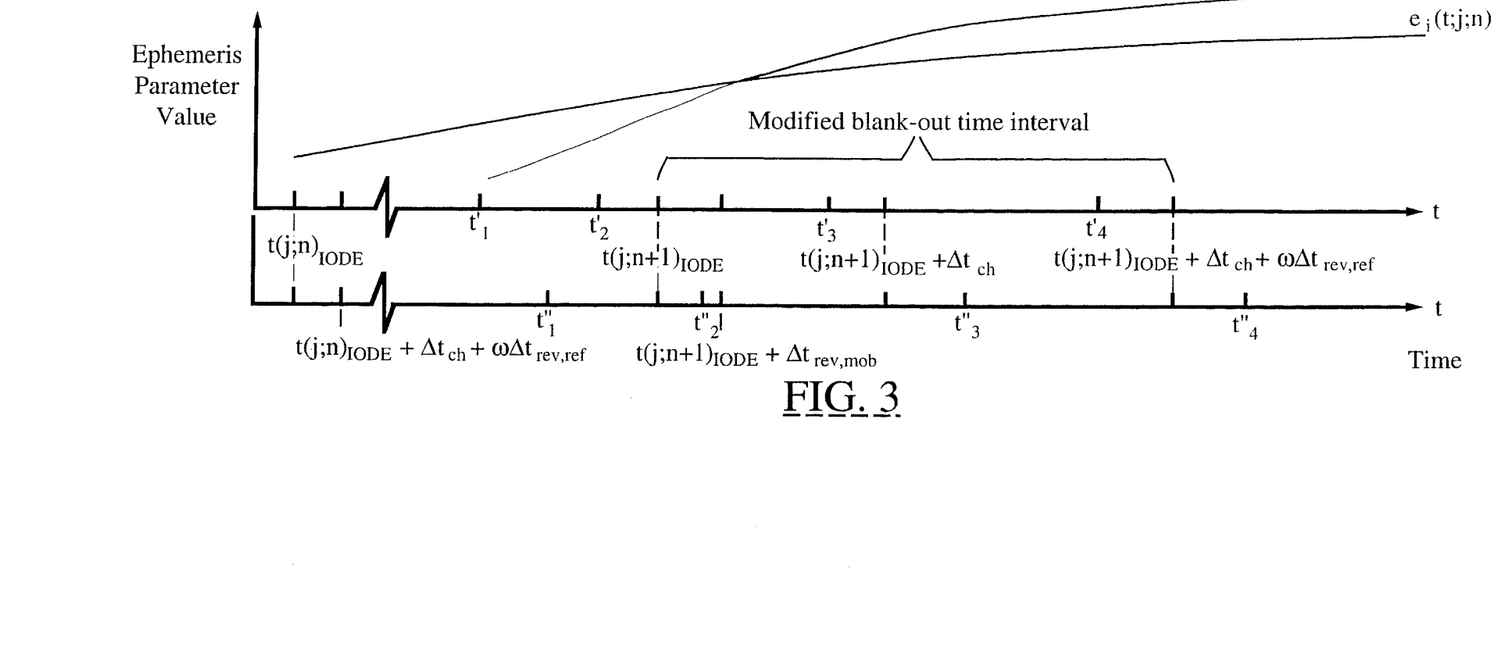
FIG. 3 graphically shows the values of an ephemeris parameter, based on the old and new ephemeris data, as a function of time.

FIG. 3 illustrates graphically the values of an old regime ephemeris parameter $e_i(t;j;n)$ and the values of a corresponding new regime ephemeris parameter $e_i(t;j;n+1)$, computed for the time interval $t(j;n)_{IODE} \leq t < t(j;n+1)_{IODE}+\Delta t_{ch}+\omega\Delta t_{rev,ref}$ and beyond, and the times $t'_q$ and $t''_q$ (q=1, 2, 3, 4) relative to each other. Here, the modified blank-out time interval is $t(j;n)_{IODE}+\Delta t_{ch}+\Delta t_{rev,mob} \leq t < t(j;n+1)_{IODE}+\Delta t_{ch}+\omega\Delta t_{rev,ref}$. Approximations for the ephemeris parameter values $e_i(t;j;n)$ and $e_i(t;j;n+1)$ and/or for the difference values $\Delta e_i(t;j;n+1, n) = e_i(t;j;n+1) - e_i(t;j;n)$ can be computed over the time intervals $t'_1 \leq t \leq t'_4$ and $t''_1 \leq t \leq t''_4$.

The length of the moving time interval, $t'_4 - t'_1$, or $t''_4 - t''_1$, is arbitrary and may be as much as 900 sec, as little as about 300 sec, or even smaller. Preferably, $$t'_2 - t'_1 \approx (t'_4 - t'_1)/3, \quad (5)$$

$$t'_3 - t'_2 \approx (t'_4 - t'_1)/3, \quad (6)$$

$$t''_2 - t''_1 \approx (t''_4 - t''_1)/3, \quad (7)$$

$$t''_3 - t''_2 \approx (t''_4 - t''_1)/3, \quad (8)$$

so that each of the time intervals $t'_1 \leq t \leq t'_4$, and $t''_1 \leq t \leq t''_4$, is divided into three sub-intervals of approximately the same length. The choices indicated in Eqs. (5), (6), (7) and (8) are convenient, but not necessary. Preferably, only the middle sub-interval, $t'_2 \leq t \leq t'_3$, or $t''_2 \leq t \leq t''_3$, is used for the approximations for the ephemeris parameters and/or the parameter differences, to enhance the accuracy of these approximations. Preferably, $$t'_3 - t'_2 \geq \Delta t_{ch} + \Delta t_{rev,ref} - \Delta t_{rev,mob}, \quad (9)$$

$$t''_3 - t''_2 \geq \Delta t_{ch} + \Delta t_{rev,ref} - \Delta t_{rev,mob}, \quad (10)$$

so that each middle sub-interval has a length at least equal to the length of the modified blank-out time interval.

The mobile station 11 estimates or predicts the old regime ephemeris lo parameters $e_i(t;j;n)$ for the first moving time interval, $t'_1 \leq t \leq t'_4$, assuming that the old ephemeris data apply during and beyond the end of the old IODE regime $(t \geq t(j;n+1)_{IODE})$, and constructs a polynomial in the time variable t of degree $M \geq 2$ $$p'_i(t;j;M) = \sum_{m=0}^{M} a'_{i,j,m} t^m \quad (i=1,2,\ldots,I), \quad (11)$$

that approximates the ephemeris parameter values $e_i(t;j;n)$ over the time interval $t'_1 \leq t \leq t'_4$. The mobile station 11 also estimates or predicts the new regime ephemeris parameters $e_i(t;j;n+1)$ for the second moving time interval, $t''_1 \leq t \leq t''_4$, where the new ephemeris parameters apply for $t \geq t(j;n+1)_{IODE}$. The mobile station 11 constructs a second polynomial in the time variable t of degree $M \geq 2$, namely, $$p''_i(t;j;M) = \sum_{m=0}^{M} a''_{i,j,m} t^m \quad (i=1,2,\ldots,I), \quad (12)$$

that approximates the ephemeris parameter values $e_i(t;j;n+1)$ over the time interval $t''_1 \leq t \leq t''_4$. For times t in the modified blank-out time interval $t(j;n+1)_{IODE} + \Delta t_{rev,mob} \leq t < t(j;n+1)_{IODE} + \Delta t_{ch} + \omega \Delta t_{rev,ref}$, the mobile station 11 approximates the new regime/old regime ephemeris parameter difference by the difference $\Delta p_i(t;j;M)$ of the two polynomials in Eqs. (11) and (12), viz.

$$\Delta e_i(t;j;n+1,n) = e_i(t;j;n+1) - e_i(t;j;n) \approx \quad (13)$$

$$\Delta p_i(t;j;M) = p''_i(t;j;M) - p'_i(t;j;M) = \sum_{m=0}^{M} \Delta a_{i,j,m} t^m,$$

with enhanced accuracy over a time sub-interval $t'_2 \leq t \leq t'_3$, or over the time sub-interval $t''_2 \leq t \leq t''_3$. The primes and double primes on the time values associated with the moving time intervals are now dropped. For definiteness, the polynomials $\Delta p_i(t;j;M)$ may (but need not) be chosen to satisfy the constraints $$\Delta p_i(t_1;j) = \Delta e_i(t_1;j;n+1,n), \quad (14)$$

$$\Delta p_i(t_{int,2};j) = \Delta e_i(t_{int,2};j;n+1,n), \quad (15)$$

$$\Delta p_i(t_{int,3};j) = \Delta e_i(t_{int,3};j;n+1,n), \quad (16)$$

$$\Delta p_i(t_4;j) = \Delta e_i(t_4;j;n+1,n), \quad (17)$$

for at least one or two interior time points $t = t_{int,2}$ and $t_{int,3}$ satisfying $t_1 < t_{int,2} < t_{int,3} < t_4$.

If the choice M=2 is made here, one interior time point $t = t_{int}$ is chosen and Eq. (13) can be rewritten in the more transparent form as $$\Delta p_i(t;j;M=2)) = \Delta e_i(t_1;j;n+1,n)(t - t_{int})(t - t_4)/ \quad (18)$$

$$(t_1 - t_{int})(t_1 - t_4) + \Delta e_i(t_{int};j;n+1,n)(t - t_1)(t - t_4)/$$

$$(t_{int} - t_1)(t_{int} - t_4) + \Delta e_i(t_4;j;n+1,n)(t - t_1)(t - t_{int})/$$

$$(t_4 - t_1)(t_4 - t_{int}).$$

If the choice M=3 is made here, two interior time points, $t = t_2$ and $t = t_3$, are chosen satisfying $t_1 < t_2 < t_3 < t_4$, Eq. (13) can be rewritten in the more transparent form as $$\Delta p_i(t;j;M=3) = \Delta e_i(t_1;j;n+1,n)(t - t_2)(t - t_3)(t - t_4)/ \quad (19)$$

$$(t_1 - t_2)(t_1 - t_3)(t_1 - t_4) +$$

$$\Delta e_i(t_2;j;n+1,n)(t - t_1)(t - t_3)(t - t_4)/$$

$$(t_2 - t_1)(t_2 - t_3)(t_2 - t_4) +$$

$$\Delta e_i(t_3;j;n+1,n)(t - t_1)(t - t_2)(t - t_4)/$$

$$(t_3 - t_1)(t_3 - t_2)(t_3 - t_4) +$$

$$\Delta e_i(t_4;j;n+1,n)(t - t_1)(t - t_2)(t - t_3)/(t_4 - t_1)(t_4 - t_2)(t_4 - t_3).$$

Where a choice $M \geq 4$ is made here, analogous forms can be used to re-express Eq. (11) or Eq. (12). Alternatively, the polynomial $\Delta p_i(t;j;M)$ that approximates the ephemeris parameter difference $\Delta e_i(t;j;n+1,n)$ during the modified blank-out time interval can be constructed directly, rather than first constructing the constituent polynomials $p'_i(t;j;M)$ and $p''_i(t;j;M)$ in Eqs. (11) and (12).

Differentially corrected GPS signal values, based upon the old regime differential GPS correction signals $DGPS(t;j;ref)$ being received from the reference station during the modified blank-out time interval $t(j;n+1)_{IODE} + \Delta t_{rev,mob} \leq t < t(j;n+1)_{IODE} + \Delta t_{ch} + \omega \Delta t_{rev,ref}$ are then estimated by the mobile station during this time interval using the following estimates for the old regime ephemeris parameters during this time interval:

$$e_i(t;j;n)_{est} = e_i(t;j;n+1) - \Delta p_i(t;j;M). \quad (20)$$

One can also estimate the ephemeris parameter values $e_i(t;j;n)$ and $e_i(t;j;n+1)$ and the parameter difference values $\Delta e_i(t;j;n+1,n)$ in the modified blank-out time interval $t(j;n+1)_{IODE} + \Delta t_{rev,mob} \leq t < t(j;n+1)_{IODE} + \Delta t_{ch} + \omega \Delta t_{rev,ref}$ by the more general functions $\pi_i(t;j;n)$, $\pi_i(t;j;n+1)$ and $\Delta \pi_i(t;j;n+1, n)$, respectively. One then estimates the old regime ephemeris parameters in the modified blank-out time interval by the approximation $$e_i(t;j;n)_{est} = e_i(t;j;n+1) - \Delta \pi_i(t;j;n+1,n). \quad (21)$$

This general approach can use polynomials, ratios of polynomials, trigonometric functions, exponential functions, logarithmic functions or other suitable functions of time t for the approximation $\Delta\pi_i(t;j;n+1,n)$ in Eq. (21).

For a general choice of the integer M ($\geq 2$) in Eqs. (11)–(12), $2\times I$ sets of (M+1) polynomial coefficients $a'_{i,j,m}$ and $a''_{i,j,m}$ must be determined and temporarily stored for the I polynomials $p'_i(t;j;M)$ and the I polynomials $p''_i(t;j;M)$. The polynomial coefficients $a'_{i,j,m}$ and $a''_{i,j,m}$ can be recomputed and stored as the moving time interval $t_1 \leq t \leq t_4$ changes, until the time variable t lies in the modified blank-out time interval $t(j;n+1)_{IODE}+\Delta t_{rev,mob} \leq t < t(j;n+1)_{IODE}+\Delta t_{ch}+\omega\Delta t_{rev,ref}$. At this point, the polynomials $p'_i(t;j;M)$ and $p''_i(t;j;M)$ given in Eqs. (11) and (12) are used by the mobile station 11 to approximate the I time-varying old regime ephemeris parameter difference values $\Delta e_i(t;j;n+1,n)$ within the middle sub-interval $t_2 \leq t \leq t_3$. The mobile station 11 now has an estimate $e_i(t;j;n)_{est}$ for the old regime ephemeris values $e_i(t;j;n)$ throughout the modified blank-out time interval, and the mobile station may continue to receive and use the DGPS information (based upon the old ephemeris data) transmitted by the reference station 31 during this time interval. After the modified blank-out time interval has ended and RTCM Type 9 messages containing the DGPS corrections are transmitted by the reference station 31 using the new regime ephemeris data, the mobile station 11 optionally terminates its reliance on the estimates $e_i(t;j;n)_{est}$ for the old regime ephemeris values and uses only the new ephemeris values $e_i(t;j;n+1)$ directly supplied by the satellite 21–j.

Alternatively, if the time $t=t(j;n+1)_{IODE}$ and the new ephemeris values $e_i(t;j;n+1)$ are known in advance by the mobile station 11, the polynomial coefficients $\Delta a_{i,j,m}$ can be computed for the modified blank-out time interval and stored until these coefficients are needed. This would eliminate the requirement that the polynomial coefficients $a'_{i,j,m}$ and/or $a''_{i,j,m}$ be re-computed and re-stored for a sequence of time values that change with the moving time interval $t_1 \leq t \leq t_4$.

In one approach, which is closer to the conventional approach, the new satellite orbit information, based on the ephemeris parameters $e_i(t;j;n+1)$, is not decoded and installed for use by the reference station until after the end of the IODE changeover time interval, at $t=t(j;n+1)_{IODE}+\Delta t_{ch}$. In this approach, the choice $\omega=1$ is made, as noted above.

In a preferable, alternative approach, the mobile station and the reference station each use the changeover time interval $t(j;n+1)_{IODE} \leq t < t(j;n+1)_{IODE}+\Delta t_{ch}$ to decode and install the new ephemeris parameters and other satellite orbit information that arrives from satellite j during this time interval. The reference station still requires a time interval of length $\Delta t_{rev,ref}$ for this decoding, for example, the time interval $t(j;n+1)_{IODE} \leq t \leq t(j;n+1)_{IODE}+\Delta t_{rev,ref}$. In this approach, the choice $\omega=0$ is made. Decoding occurs during the changeover time interval, and no additional time interval is required for this decoding after the changeover time interval ends (at $t=t(j;n+1)_{IODE}+\Delta t_{ch}$).

In another approach, the ephemeris parameters $e_i(t;j;n)$ and $e_i(t;j;n+1)$ are replaced by the respective ranges or pseudoranges $R(t;j;n)$ and $R(t;j;n+1)$ from the satellite 21–j to the reference station at a time t for the respective time intervals IODE(j;n) and IODE(j;n+1). In this approach, the mobile station 11 approximates the ranges $R(t;j;n)$ and $R(t;j;n+1)$ for the old IODE regime and for the new IODE regime, respectively, by Mth degree polynomials ($M \geq 1$)

$$R(t;j;n) \approx r'(t;j;M) = \sum_{m=0}^{M} b'_{j,m} t^m \qquad (22)$$

($i = 1, \ldots, I$; old regime)

$$R(t;j;n+1) \approx r''(t;j;M) = \sum_{m=0}^{M} b''_{j,m} t^m \qquad (23)$$

($i = 1, \ldots, I$; new regime)

for the modified blank-out time interval $t(j;n+1)_{IODE}+\Delta t_{rev,mob} \leq t < t(j;n+1)_{IODE}+\Delta t_{ch}+\Delta t_{rev,ref}$. The range difference $$\Delta R(t;j) = R(t;j;n+1) - R(t;j;n) = r''(t;j;M) - r'(t;j;M) = \qquad (24)$$

$$\Delta r(t;j;M) = \sum_{m=0}^{M} \Delta b_{j,m} t^m,$$

is computed and approximated for the modified blank-out time interval, in a manner analogous to computation and approximation of the ephemeris parameter difference $\Delta e_i(t;j;n+1,n)$. The approximating polynomials $\Delta r(t;j;M)$ provide range estimates according to the old IODE regime during the modified blank-out time interval, viz.

$$R(t;j;n)_{est} = R(t;j;n+1) - \Delta r(t;j;M). \qquad (25)$$

The old regime range estimates $R(t;j;n)_{est}$ are then used to estimate the uncorrected GPS signals during the modified blank-out time interval, and the old regime DGPS correction signals received from the reference station 31 during this time interval are used to produce corrected GPS signals at the mobile station. By analogy with computation of the estimated ephemeris parameter $e_i(t;j;M)_{est}$, the range values $R(t;j;n)$ and $R(t;j;n+1)$ may be approximated by more general functions $\rho(t;j;n)$ and $\rho(t;j;n+1)$, which may be polynomials, ratios of polynomials, trigonometric functions, sums and rations of exponential functions, logarithmic functions and other suitable functions.

Figure 4:
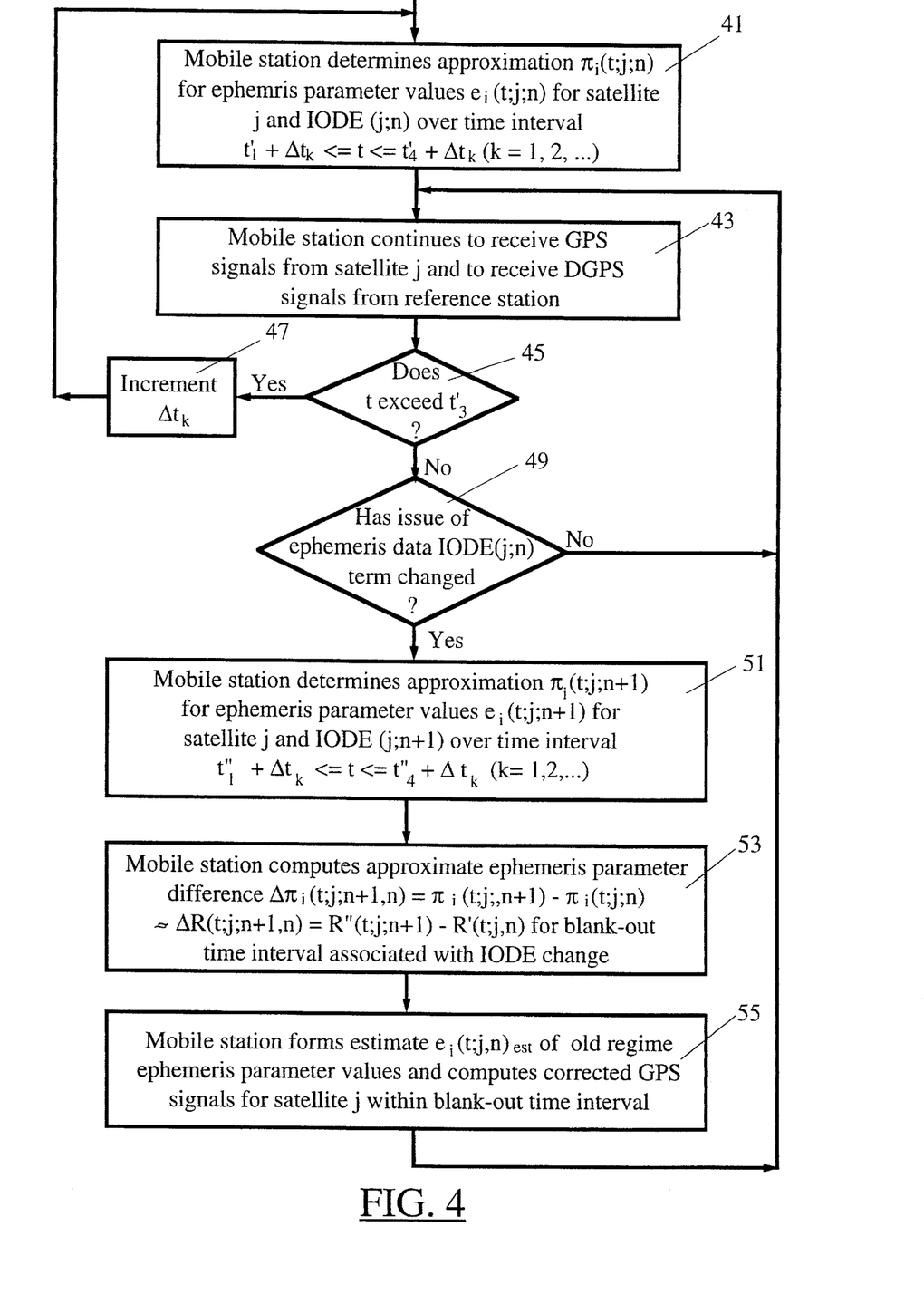
FIGS. 4 and 5 are flow charts of embodiments of the invention, using differences of ephemeris parameters and of ranges, respectively.

FIG. 4 is a flow chart illustrating one embodiment of the invention, using approximations for the ephemeris parameter differences $\Delta e_i(t;j;n+1,n)$. During any one pass through the procedural steps shown in the flow chart in FIG. 4, the time variable t lies in a time interval $t'_1+\Delta t_k \leq t \leq t'_4+\Delta t_k$, with intermediate time values $t'_2$ and $t'_3$ satisfying $t'_1 < t'_2 < t'_3 < t'_4$, where $\Delta t_k$ is a time interval length satisfying $0 < \Delta t_1 < \Delta t_2 < \ldots < \Delta t_k < \Delta t_{k+1} < \ldots$ and, preferably, $t'_4 + \Delta t_k = t'_1 + \Delta t_{k+1}$.

In step 41, the GPS mobile station 11 (FIG. 1) determines and stores the coefficients for a function $\pi_i(t;j;n)$ in the time variable t that approximates the ephemeris parameter values $e_i(t;j;n)$ for satellite number j for the old IODE regime over a selected time interval, $t'_1 \leq t \leq t'_4$, which time interval may move with the present value of the time variable t. In step 43, the mobile station continues to receive GPS signals for the new IODE regime from satellite j and to receive differential GPS correction signals for satellite j from the GPS reference station 31 (FIG. 1) corresponding to the old IODE regime.

In step 45, the mobile station determines whether the time variable t is greater than the intermediate value $t'_3$. If the answer in step 45 is "yes," the mobile station increments $\Delta t_k$ (replaces $\Delta t_k$ by $\Delta t_{k+1}$) in step 47 and recycles to step 41. If the answer in step 45 is "no," the mobile station determines whether the IODE regime has changed, from IODE(j;n) to IODE(j;n+1), in step 49. If the answer in step 49 is "no," the mobile station recycles to step 43. If the answer in step 49 is "yes," the mobile station proceeds to step 51.

In step 51, the mobile station determines and stores the coefficients for a function $\pi_i(t;j;n+1)$ in the time variable t that approximates the ephemeris parameter values $e_i(t;j;n+1)$ for satellite number j for the new IODE regime over a selected time interval, $t''_1 \leq t \leq t''_4$. In step 53, the mobile station forms the difference $\Delta\pi_i(t;j;n+1,n)=\pi_i(t;j;n+1)-\pi_i(t;j;n)$ that approximates the ephemeris parameter difference values $\Delta e_i(t;j;n+1;n)$ in the modified blank-out time interval associated with the IODE changeover from IODE(j;n) to IODE(j;n+1).

In step 55, the mobile station forms an estimate $e_i(t;j;n)_{est}=e_i(t;j;n+1)-\Delta\pi_i(t;j;n+1,n)$ for the old regime ephemeris parameter for the modified blank-out time interval, uses this estimate to compute the uncorrected GPS pseudorange values associated with the GPS signals received from satellite j, and corrects this range or pseudorange value using the old regime DGPS correction values received from the reference station during the modified blank-out time interval.

Figure 5:
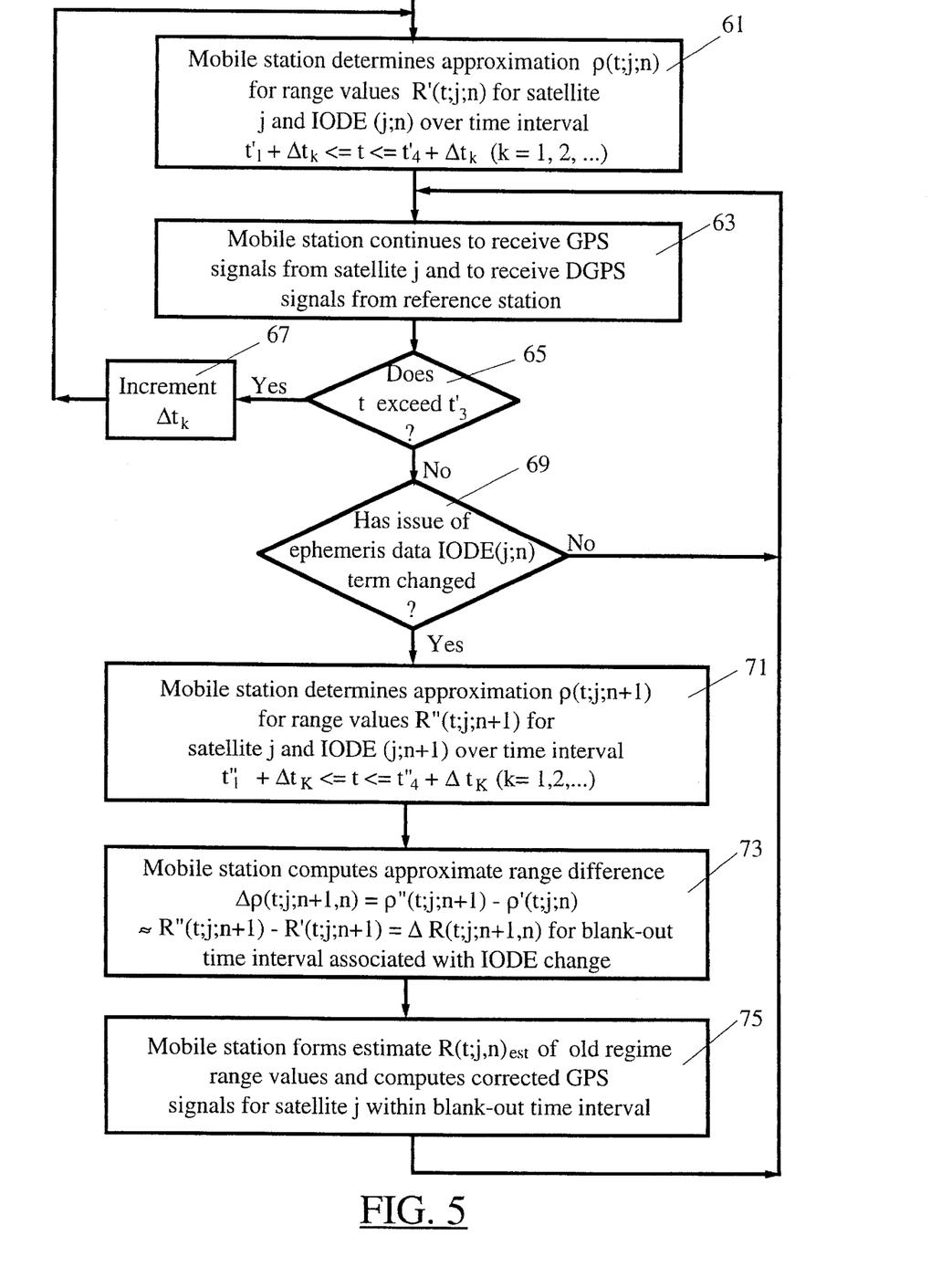

FIG. 5 is a flow chart illustrating another embodiment of the invention, using approximations for the range differences $\Delta R(t;j;n+1,n)=R(t;j;n+1)-R(t;j;n)$. The times $t'_q (q,=1, 2, 3, 4)$ and $\Delta t_k$ have the same interpretations as in FIG. 4.

In step 61, the GPS mobile station 11 (FIG. 1) determines and stores the coefficients for a function $\rho(t;j;n)$ in the time variable t that approximates the range values $R(t;j;n)$ for satellite number j for the old IODE regime over a selected time interval, $t'_1 \leq t \leq t'_4$, which time interval may move with the present value of the time variable t. In step 63, the mobile station continues to receive GPS signals for the new IODE regime from satellite j and to receive differential GPS correction signals for satellite j from the GPS reference station 31 (FIG. 1) corresponding to the old IODE regime.

In step 65, the mobile station determines whether the time variable t is greater than the intermediate value $t'_3$. If the answer in step 65 is "yes," the mobile station increments $\Delta t_k$ (replaces $\Delta t_k$ by $\Delta t_{k+1}$) in step 67 and recycles to step 61. If the answer in step 65 is "no," the mobile station determines whether the IODE regime has changed, from IODE(j;n) to IODE(j;n+1), in step 69. If the answer in step 69 is "no," the mobile station recycles to step 63. If the answer in step 69 is "yes," the mobile station proceeds to step 61.

In step 61, the mobile station determines and stores the coefficients for a function $\rho(t;j;n+1)$ in the time variable t that approximates the range values $R(t;j;n+1)$ for satellite number j for the new IODE regime over a selected time interval, $t''_1 \leq t \leq t''_4$. In step 73, the mobile station forms the difference $\Delta r(t;j;n+1,n)=\rho(t;j;n+1)-\rho(t;j;n)$ that approximates the range difference values $\Delta R(t;j;n+1,n)$ in the modified blank-out time interval associated with the IODE changeover from IODE(j;n) to IODE(j;n+1).

In step 75, the mobile station forms an estimate $R(t;j;n)_{est}=R(t;j;n+1)-\Delta\rho(t;j;n+1,n)$ for the old regime ephemeris parameter for the modified blank-out time interval, uses this estimate to compute the uncorrected GPS pseudorange values associated with the GPS signals received from satellite j, and corrects this range or pseudorange value using the old regime DGPS correction values received from the reference station during the modified blank-out time interval.

As another alternative, the old regime ephemeris parameter values and/or the old regime range values during the modified blank-out time interval may be estimated by the respective estimates $$e_i(t;j;n)_{est,2}=\pi_i(t;j;n), \quad (26)$$

$$R(t;j;n)_{est,2}=r(t;j;n). \quad (27)$$

These last two estimates are likely to be less accurate than the estimates in Eqs. (21) and (25), where only the differences $\Delta\pi_i$ and $\Delta\rho$ are approximated.

As another alternative, the range values $R(t;j;n+1)$ and the range difference values $\Delta R(t;j;n+1,n)$ can be approximated by separately determined functions $\rho'(t;j;n+1)$ and $\Delta\rho(t;j;n+1,n)$, respectively, within the modified blank-out time interval, $t(j;n+1)_{IODE}+\Delta t_{rev,mob} \leq t < t(j;n+1)_{IODE}+\Delta t_{ch}+\omega\Delta t_{rev,rep}$, and the old regime range values during this time interval may be estimated by the function $$R(t;j;n)_{est,3}=\rho'(t;j;n+1)+\Delta\rho''(t;j;n+1,n), \quad (28)$$

where the functions $\rho'$ and $\Delta\rho''$ are polynomials, ratios of polynomials, trigonometric functions, sums or ratios of exponential functions, logarithm functions or other suitable functions of the time variable t.

If the target mobile GPS station is not using GPS signals from a given satellite to determine its present location, velocity and/or time of observation (i.e., that GPS satellite is not part of the constellation used by this GPS mobile station), the computations performed by this target mobile GPS station are not affected, and IODE changeover for that GPS satellite can be ignored.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System. The invention disclosed herein can be applied to any SATPS that involves IODE changeover.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=154 f0 and f2=120 f0 of a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, pp. 1–90.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably tour or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Logsdon, op cit.

I claim:

1. A method for compensating for temporary loss of differential GPS correction signals for a satellite during an IODE changeover interval, the method comprising the steps of:

receiving ephemeris data for a satellite, numbered j, during two consecutive IODE time intervals, given by $t(j;n)_{IODE} \leq t < t(j;n+1)_{IODE}$, and $t(j;n+1)_{IODE} \leq t < t(j;n+2)_{IODE}$, when the ephemeris data are available for at least one satellite numbered j=1, . . . , J (J≥3);

receiving differential GPS correction signals for satellite number j for a time interval $t(j;n)_{IODE} + \Delta t_{ch} + \Delta t_{rev,ref} \leq t < t(j;n+1)_{IODE} + \Delta t_{ch} + \Delta t_{rev,ref}$, based upon ephemeris data that are applicable for the IODE time interval $t(j;n)_{IODE} \leq t < t(j;n+1)_{IODE}$ for satellite j, where $\Delta t_{ch}$ is a first selected non-negative temporal length, $\Delta t_{rev,ref}$ is a second selected positive temporal length;

receiving differential GPS correction signals for satellite j for a time interval $t(j;n+1)_{IODE} + \Delta t_{ch} + \Delta t_{rev,ref} \leq t < t(j;n+2)_{IODE} + \Delta t_{ch} + \Delta t_{rev,ref}$, based upon ephemeris data that are applicable for the time interval $t(j;n+1)_{IODE} \leq t < t(j;n+2)_{IODE}$ for satellite j;

for two selected times $t=t'_2$ and $t=t'_3$ satisfying the constraints $t(j;n)_{IODE} < t'_2 \leq t(j;n+1)_{IODE} < t'_3$, determining the time variation of each of I ephemeris parameters $e_i(t;j;n)$ (i=1, ..., I; I≧1) that determine the ephemeris of satellite j during the time interval given by $t'_2 \leq t < t'_3$;

for two selected times $t=t''_2$ and $t=t''_3$ satisfying the constraints $t(j;n+1)_{IODE}+\Delta t_{rev,mob} \leq t''_2 < t''_3$, determining the time variation of each of I ephemeris parameters $e_i(t;j;n+1)$ (i=1, ..., I; I≧1) that determine the ephemeris of satellite j during the time interval given by $t''_2 \leq t < t''_3$, where $\Delta t_{rev,mob}$ is a third selected positive temporal length;

determining an approximation $\Delta \pi_i(t;j;n+1,n)$ for each of the I ephemeris parameter difference values $\Delta e_i(t;j;n+1,n)=e_i(t;j;n+1)-e_i(t;j;n)$ in a time interval that includes at least a portion of the time interval $t(j;n+1)_{IODE}+\Delta t_{rev,mob} \leq t < t(j;n+1)_{IODE}+\Delta t_{ch}+\Delta t_{rev,ref}$; and estimating the values of each of the I ephemeris parameters $e_i(t;j;n)$ in at least a portion of the time interval $t(j;n+1)_{IODE}+\Delta t_{rev,mob} \leq t < t(j;n+1)_{IODE}+\Delta t_{ch}+\Delta t_{rev,ref}$ by the approximation $e_i(t;j;n)_{est}=e_i(t;j;n+1)-\Delta \pi_i(t;j;n+1,n)$.

2. The method of claim 1, further comprising the step of choosing said approximation $\pi_i(t;j;n+1,n)$ for said ephemeris parameter difference $\Delta e_i(t;j;n+1,n)$ from the class of functions consisting of polynomials, ratios of polynomials, trigonometric functions, sums and ratios of exponential functions, and logarithm functions.

3. The method of claim 2, further comprising the step of choosing said approximation $\pi_i(t;j;n+1,n)$ to be a polynomial of degree M≧2 in the time variable t.

4. The method of claim 1, further comprising the step of choosing said second temporal length $\Delta t_{rev,ref}$ to be not less than 18 seconds and not more than 600 seconds.

5. The method of claim 1, further comprising the step of choosing said third temporal length $\Delta t_{rev,mob}$ to be not less than 18 seconds and not more than 600 seconds.

6. A method for compensating for temporary loss of differential GPS correction signals for a satellite during an IODE changeover interval, the method comprising the steps of:

receiving ephemeris data for a satellite, numbered j, during two consecutive IODE time intervals, given by $t(j;n)_{IODE} \leq t < t(j;n+1)_{IODE}$, and $t(j;n+1)_{IODE} \leq t < t(j;n+2)_{IODE}$, when the ephemeris data are available for at least one satellite numbered j=1, ..., J (J≧3);

receiving differential GPS correction signals for satellite number j for a time interval $t(j;n)_{IODE}+\Delta t_{ch}+\Delta t_{rev,ref} \leq t < t(j;n+1)_{IODE}+\Delta t_{ch}+\Delta t_{rev,ref}$, based upon ephemeris data that are applicable for the IODE time interval $t(j;n)_{IODE} \leq t < t(j;n+1)_{IODE}$ for satellite j, where $\Delta t_{ch}$ is a first selected non-negative temporal length, $\Delta t_{rev,ref}$ is a second selected positive temporal length;

receiving differential GPS correction signals for satellite j for a time interval $t(j;n+1)_{IODE}+\Delta t_{ch}+\Delta t_{rev,ref} \leq t < t(j;n+2)_{IODE}+\Delta t_{ch}+\Delta t_{rev,ref}$, based upon ephemeris data that are applicable for the time interval $t(j;n+1)_{IODE} \leq t < t(j;n+2)_{IODE}$ for satellite j;

for two selected times $t=t'_2$ and $t=t'_3$ satisfying the constraints $t(j;n)_{IODE} < t'_2 \leq t(j;n+1)_{IODE} < t'_3$, determining the time variation of the range $R(t;j;n)$ from satellite j to a selected location from ephemeris data that determine the ephemeris of satellite j during the time interval given by $t'_2 \leq t < t'_3$;

for two selected times $t=t''_2$ and $t=t''_3$ satisfying the constraints $t(j;n+1)_{IODE}+\Delta t_{rev,mob} \leq t''_2 < t''_3$, determining the time variation of the range $R(t;j;n+1)$ from satellite j to the selected location from ephemeris data that determine the ephemeris of satellite j during the time interval given by $t''_2 \leq t < t''_3$, where $\Delta t_{rev,mob}$ is a third selected positive temporal length;

determining an approximation $\Delta \rho(t;j;n+1,n)$ for the range difference values $\Delta R(t;j;n+1,n)=R(t;j;n+1)-R(t;j;n)$ in a time interval that includes at least a portion of the time interval $t(j;n+1)_{IODE}+\Delta t_{rev,mob} \leq t < t(j;n+1)_{IODE}+\Delta t_{ch}+\Delta t_{rev,ref}$; and estimating the range values $R(t;j;n)$ in at least a portion of the time interval $t(j;n+1)_{IODE}+\Delta t_{rev,mob} \leq t < t(j;n+1)_{IODE}+\Delta t_{ch}+\Delta t_{rev,ref}$ by the approximation $R(t;j;n)_{est}=R(t;j;n+1)-\Delta \rho(t;j;n+1,n)$.

7. The method of claim 6, further comprising the step of choosing said approximation $\Delta \rho(t;j;n+1,n)$ for said range difference $\Delta R(t;j;n+1,n)$ from the class of functions consisting of polynomials, ratios of polynomials, trigonometric functions, sums and ratios of exponential functions, and logarithm functions.

8. The method of claim 7, further comprising the step of choosing said approximation $\Delta \rho(t;j;n+1,n)$ to be a polynomial of degree M≧1 in the time variable t.

9. The method of claim 6, further comprising the step of choosing said second temporal length $\Delta t_{rev,ref}$ to be not less than 18 seconds and not more than 600 seconds.

10. The method of claim 6, further comprising the step of choosing said third temporal length $\Delta t_{rev,mob}$ to be not less than 18 seconds and not more than 600 seconds.

11. A method for compensating for temporary loss of differential GPS correction signals for a satellite during an IODE changeover interval, the method comprising the steps of:

receiving ephemeris data for a satellite, numbered j, during two consecutive IODE time intervals, given by $t(j;n)_{IODE} \leq t < t(j;n+1)_{IODE}$, and $t(j;n+1)_{IODE} \leq t < t(j;n+2)_{IODE}$, when the ephemeris data are available for at least one satellite numbered j=1, ..., J (J≧3);

receiving differential GPS correction signals for satellite number j for a time interval $t(j;n)_{IODE}+\Delta t_{ch}+\Delta t_{rev,ref} \leq t < t(j;n+1)_{IODE}+\Delta t_{ch}+\Delta t_{rev,ref}$, based upon ephemeris data that are applicable for the IODE time interval $t(j;n)_{IODE} \leq t < t(j;n+1)_{IODE}$ for satellite j, where $\Delta t_{ch}$ is a first selected non-negative temporal length, $\Delta t_{rev,ref}$ is a second selected positive temporal length;

receiving differential GPS correction signals for satellite j for a time interval $t(j;n+1)_{IODE}+\Delta t_{ch}+\Delta t_{rev,ref} \leq t < t(j;n+2)_{IODE}+\Delta t_{ch}+\Delta t_{rev,ref}$, based upon ephemeris data that are applicable for the time interval $t(j;n+1)_{IODE} \leq t < t(j;n+2)_{IODE}$ for satellite j;

for two selected times $t=t'_2$ and $t=t'_3$ satisfying the constraints $t(j;n)_{IODE} < t'_2 \leq t(j;n+1)_{IODE} < t'_3$, determining the time variation of each of I ephemeris parameters $e_i(t;j;n)$ (i=1, ..., I; I≧1) that determine the ephemeris of satellite j during the time interval given by $t'_2 \leq t < t'_3$;

for two selected times $t=t''_2$ and $t=t''_3$ satisfying the constraints $t(j;n+1)_{IODE}+\Delta t_{rev,mob} \leq t''_2 < t''_3$, determining the time variation of each of I ephemeris parameters $e_i(t;j;n+1)$ (i=1, ..., I; I≧1) that determine the ephemeris of satellite j during the time interval given by $t''_2 \leq t < t''_3$, where $\Delta t_{rev,mob}$ is a third selected positive temporal length;

determining an approximation $\pi_i(t;j;n)$ for each of the I ephemeris parameter values $e_i(t;j;n)$ in a time interval that includes at least a portion of the time interval $t(j;n+1)_{IODE}+\Delta t_{rev,mob} \leq t < t(j;n+2)_{IODE}+\Delta t_{ch}+\Delta t_{rev,ref}$; and estimating the values of each of the I ephemeris parameters $e_i(t;j;n)$ in at least a portion of the time interval $t(j;n+1)_{IODE}+\Delta t_{rev,mob} \leq t < t(j;n+1)_{IODE}+\Delta t_{ch}+\Delta t_{rev,ref}$ by the approximation $e_i(t;j;n)_{est}=\pi_i(t;j;n)$.

12. A method for compensating for temporary loss of differential GPS correction signals for a satellite during an IODE changeover interval, the method comprising the steps of:

receiving ephemeris data for a satellite, numbered j, during two consecutive IODE time intervals, given by $t(j;n)_{IODE} \leq t < t(j;n+1)_{IODE}$, and $t(j;n+1)_{IODE} \leq t < t(j;n+2)_{IODE}$, when the ephemeris data are available for at least one satellite numbered $j=1, \ldots, J$ ($J \geq 3$);

receiving differential GPS correction signals for satellite number j for a time interval $t(j;n)_{IODE}+\Delta t_{ch}+\Delta t_{rev,ref} \leq t < t(j;n+1)_{IODE}+\Delta t_{ch}+\Delta t_{rev,ref}$, based upon ephemeris data that are applicable for the IODE time interval $t(j;n)_{IODE} \leq t < t(j;n+1)_{IODE}$ for satellite j, where $\Delta t_{ch}$ is a first selected non-negative temporal length, $\Delta t_{rev,ref}$ is a second selected positive temporal length;

receiving differential GPS correction signals for satellite j for a time interval $t(j;n+1)_{IODE}+\Delta t_{ch}+\Delta t_{rev,ref} \leq t < t(j;n+2)_{IODE}+\Delta t_{ch}+\Delta t_{rev,ref}$, based upon ephemeris data that are applicable for the time interval $t(j;n+1)_{IODE} \leq t < t(j;n+2)_{IODE}$ for satellite j;

for two selected times $t=t'_2$ and $t=t'_3$ satisfying the constraints $t(j;n)_{IODE} < t'_2 \leq t(j;n+1)_{IODE} < t'_3$, determining the time variation of the range $R(t;j;n)$ from satellite j to a selected location from ephemeris data that determine the ephemeris of satellite j during the time interval given by $t'_2 \leq t < t'_3$;

for two selected times $t=t''_2$ and $t=t''_3$ satisfying the constraints $t(j;n+1)_{IODE}+\Delta t_{rev,mob} \leq t''_2 < t''_3$, determining the time variation of the range $R(t;j;n+1)$ from satellite j to the selected location from ephemeris data that determine the ephemeris of satellite j during the time interval given by $t''_2 \leq t < t''_3$, where $\Delta t_{rev,mob}$ is a third selected positive temporal length;

determining an approximation $\rho(t;j;n)$ for the range values $R(t;j;n)$ in a time interval that includes at least a portion of the time interval $t(j;n+1)_{IODE}+\Delta t_{rev,mob} \leq t < t(j;n+1)_{IODE}+\Delta t_{ch}+\Delta t_{rev,ref}$; and estimating the range values $R(t;j;n)$ in at least a portion of the time interval $t(j;n+1)_{IODE}+\Delta t_{rev,mob} \leq t < t(j;n+1)_{IODE}+\Delta t_{ch}+\Delta t_{rev,ref}$ by the approximation $R(t;j;n)_{est}=\rho(t;j;n)$.

13. A method for compensating for temporary loss of differential GPS correction signals for a satellite during an IODE changeover interval, the method comprising the steps of:

receiving ephemeris data for a satellite, numbered j, during two consecutive IODE time intervals, given by $t(j;n)_{IODE} \leq t < t(j;n+1)_{IODE}$, and $t(j;n+1)_{IODE} \leq t < t(j;n+2)_{IODE}$, when the ephemeris data are available for at least one satellite numbered $j=1, \ldots, J$ ($J \geq 3$);

receiving differential GPS correction signals for satellite number j for a time interval $t(j;n)_{IODE}+\Delta t_{ch}+\Delta t_{rev,ref} \leq t < t(j;n+1)_{IODE}+\Delta t_{ch}+\Delta t_{rev,ref}$, based upon ephemeris data that are applicable for the IODE time interval $t(j;n)_{IODE} \leq t < t(j;n+1)_{IODE}$ for satellite j, where $\Delta t_{ch}$ is a first selected non-negative temporal length, $\Delta t_{rev,ref}$ is a second selected positive temporal length;

receiving differential GPS correction signals for satellite j for a time interval $t(j;n+1)_{IODE}+\Delta t_{ch}+\Delta t_{rev,ref} \leq t < t(j;n+2)_{IODE}+\Delta t_{ch}+\Delta t_{rev,ref}$, based upon ephemeris data that are applicable for the time interval $t(j;n+1)_{IODE} \leq t < t(j;n+2)_{IODE}$ for satellite j;

for two selected times $t=t'_2$ and $t=t'_3$ satisfying the constraints $t(j;n)_{IODE} < t'_2 \leq t(j;n+1)_{IODE} < t'_3$, determining the time variation of the range $R(t;j;n)$ from satellite j to a selected location from ephemeris data that determine the ephemeris of satellite j during the time interval given by $t'_2 \leq t < t'_3$;

for two selected times $t=t''_2$ and $t=t''_3$ satisfying the constraints $t(j;n+1)_{IODE}+\Delta t_{rev,mob} \leq t''_2 < t''_3$, determining the time variation of the range $R(t;j;n+1)$ from satellite j to the selected location from ephemeris data that determine the ephemeris of satellite j during the time interval given by $t''_2 \leq t < t''_3$, where $\Delta t_{rev,mob}$ is a third selected positive temporal length;

determining a first approximation $\rho'(t;j;n+1)$ for the range values $R(t;j;n+1)$ in a time interval that includes at least a portion of the time interval $t(j;n+1)_{IODE}+\Delta t_{rev,mob} \leq t < t(j;n+1)_{IODE}+\Delta t_{ch}+\Delta t_{rev,ref}$;

determining a second approximation $\Delta \rho''(t;j;n+1,n)$ for the range difference values $\Delta R(t;j;n+1,n)=R(t;j;n+1)-R(t;j;n)$ in a time interval that includes at least a portion of the time interval $t(j;n+1)_{IODE}+\Delta t_{rev,mob} \leq t < t(j;n+1)_{IODE}+\Delta t_{ch}+\Delta t_{rev,ref}$; and estimating the range values $R(t;j;n)$ in at least a portion of the time interval $t(j;n+1)_{IODE}+\Delta t_{rev,mob} \leq t < t(j;n+1)_{IODE}+\Delta t_{ch}+\Delta t_{rev,ref}$ by the approximation $R(t;j;n)_{est}=\rho'(t;j;n+1)-\Delta \rho''(t;j;n+1,n)$.

\* \* \* \* \*